Nov. 22, 1949     W. D. TEAGUE, JR     2,488,649
SUCTION THROTTLING VALVE
Original Filed Nov. 16, 1944
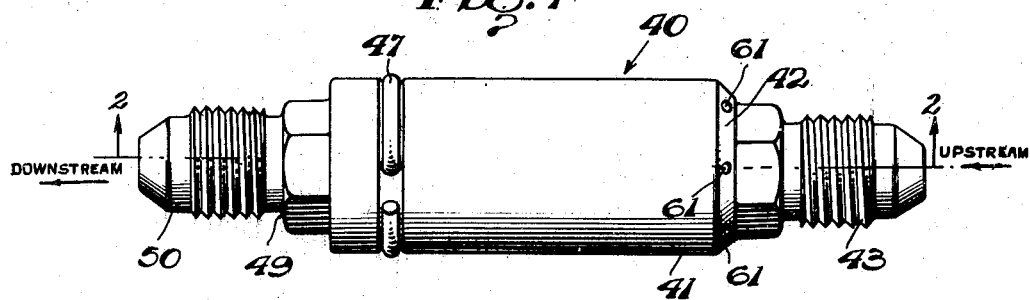
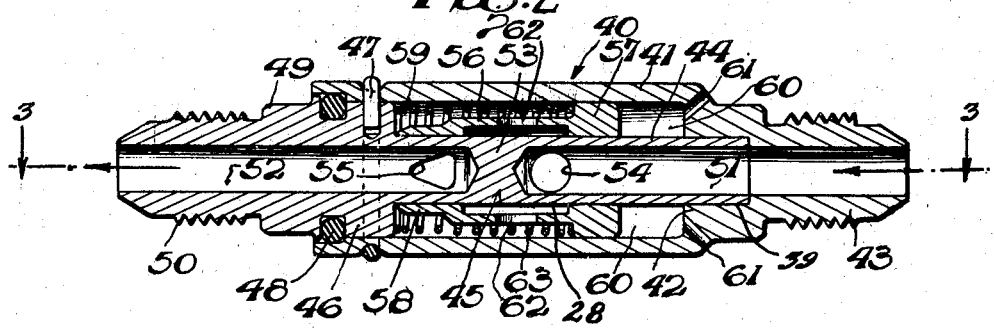
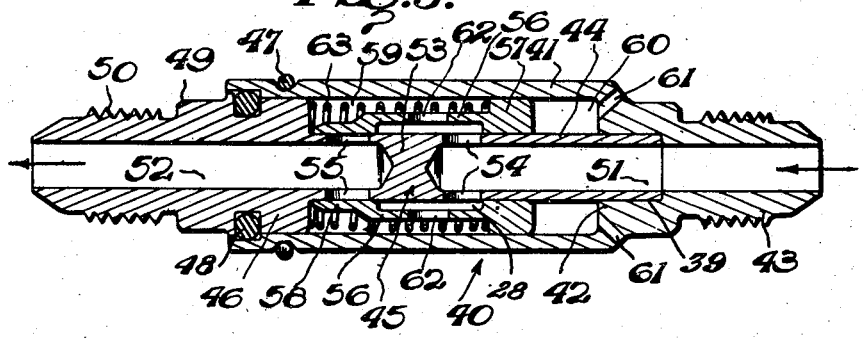
Inventor
Walter D. Teague, Jr.
By Chas. M. Funkhouser
Attorney Patented Nov. 22, 1949

2,488,649

UNITED STATES PATENT OFFICE 2,488,649

SUCTION THROTTLING VALVE

Walter D. Teague, Jr., Alpine, N. J., assignor to Bendix Aviation Corporation, Teterboro, N. J., a corporation of Delaware Original application November 16, 1944, Serial No. 563,769. Divided and this application October 23, 1947, Serial No. 781,532

2 Claims. (Cl. 137—153)

This invention relates to valves and particularly to suction valves of the throttling type.

One object of the invention is to provide a valve of the above-indicated character which is provided with flow responsive means of a relatively high sensitivity for controlling fluid suction, whereby instruments and devices of a sensitive and precisional type may be accurately operated.

Another object of the invention is to provide a valve as indicated which is provided with means for maintaining suction at a desired value and which may be readily adapted to change the value.

Another object of the invention is to provide a suction throttling valve which is simple and durable in construction, economical in manufacture, and effective in its operation.

The above and other objects and features of the invention will appear more fully hereinafter from a consideration of the following description taken in connection with the accompanying drawing wherein one embodiment of the invention is illustrated by way of example.

This application is a division of copending application Serial No. 563,769, Valves, filed November 16, 1944.

In the drawing:

Figure 1 is a side elevation of a suction throttling valve constructed in accordance with the invention;

Figure 2 is a sectional view taken on the line 2—2 of Figure 1; and

Figure 3 is a sectional view taken on the line 3—3 of Figure 2.

As shown in the drawing, the valve 40 is of the instrument suction throttling type, as employed in a system for regulating suction below atmospheric pressure for low flow applications, such as instrument operation. When so employed, the valve is located between a high or varying suction source and the instrument or chamber in which the suction is to be regulated, a specific application being the operation of a gyro-compass, turn and bank indicator and/or artificial horizon from an unsupercharged engine manifold in relatively light aircraft. As disclosed, the valve 40 comprises a housing member or cylinder 41 which is open at one end, the left as shown, and provided with a wall 42 at the opposite or right end, the wall 42 being formed with a fitting 43 for connection to a pipe leading to the valve from the instrument to be operated upstream of the system. The fitting 43 is provided with a bore formed inwardly with a counterbore 39 in which is seated the inner end section 44 of a pilot member 45 disposed in the housing member and formed with a collar or wall 46 closing the open end of the housing member and secured thereto by means of a detachable split ring 47. The latter is disposed in a peripheral groove of the cylinder 41, which groove has an aperture through the cylinder side wall in register with a hole in the wall 46 for the reception of an inturned end of the ring 47.

The wall 46 is formed with a circumferential groove in which is contained a packing 48 engaging an inner seal surface of the cylinder 41 and forming a seal between the wall and the cylinder. The outer end section 49 of the pilot member is formed with a fitting 50 similar to the fitting 43 for connection to a pipe leading to the suction source downstream of the valve. The inner and outer end sections 44 and 49 of the pilot member are provided with axially aligned spaced passages 51 and 52 separated by a partition or wall 53. On the inlet or right side of the partition 53, the circumferential face of the pilot member is formed with a pair of opposite side ports 54 communicating with the passage 51 and on the outlet or left side with a pair of similarly arranged, but triangularly-shaped, ports 55 communicating with the passage 52.

Slidably mounted upon the pilot member 45 is a cylinder or sleeve valve member 56 which constitutes a piston and is formed, on the end next to the wall 42, with a piston head 57, and, on its opposite end, with a valve sleeve portion 58. The head 57 defines a pair of expansible suction and atmospheric chambers 59 and 60, respectively, within the housing member 41, the chamber 60 communicating with the atmosphere by means of inlet or vent openings 61 formed in the wall 42 of the housing member, whereby atmospheric pressure is always present in the chamber 60. The valve member 56, between the head 57 and the sleeve 58, is provided with apertures or ducts 62 effecting communication between the passage 51 and the suction chamber 59 through the ports 54 and a cylindrical recess or channel 28 about the pilot member 45, as illustrated in Figures 2 and 3. The sleeve portion 58 of the valve member or piston has in full suction operated position, abutting engagement with the collar 46, and serves to control or vary the areas of the ports 55 to regulate flow from the chamber 59 to the passage 52, as hereinfurther set forth. A spring 63, surrounding the piston or valve member 56, has one end engaging the piston head 57 and the opposite end engaging the wall 46, and biases the valve member away from the wall to effect communication from the passage 51 through the ports 54, the channel 28, the ducts 62, the chamber 59, and the ports 55 to the passage 52.

In operation, prior to operation of the suction source, the valve member 56 is biased by the spring 63 to its full off position adjacent to the wall 42, and provides communication between the passages 51 and 52 with the result that instrument operation will be effected when suction starts. When the differential pressure, between atmospheric and regulated suction, times the projected area of the valve member, exceeds the force of the spring 63, the valve member 56 will be actuated, to the left as shown, towards the collar 46 to gradually reduce the areas of the ports 55. Obviously, by utilizing a spring with a given force and rate value, the suction will be regulated within the limits dependent upon the spring rate, since throttling of the flow by restricting or closing the ports 55 will reduce the regulated suction therethrough.

Although only one embodiment of the invention has been illustrated and described, various changes in the form and relative arrangements of the parts may be made to suit requirements.

What is claimed is:

1. A suction throttling device comprising a tube including an intermediate bore closure partition dividing the bore into inlet and outlet lengths having inlet and outlet side ports, respectively, and having a radially outer wall beyond the outlet port from the inlet port, a housing forming a piston chamber around the tube enclosing said ports and having an inlet end closure and an inlet communicating with said tube inlet length, the housing being closed at the other end relative to the tube by said wall and having a vent to atmosphere at the inlet side of said partition, a sleeve valve forming a cylindrical channel around the tube axially defined by annular portions of the sleeve axially slidably telescoping the tube and open to said channel through said inlet port, said valve having, in the full suction operated condition of the device, a sleeve portion closing said outlet port, a piston head dividing said chamber into a chamber open to atmosphere through said vent, and a suction chamber opposite said outlet port, said sleeve also having a duct communicating between said channel and said suction chamber, and a compression spring surrounding the tube and the sleeve in the cylinder between said wall and said piston head.

2. A suction throttling device comprising means having a bore divided into inlet and outlet lengths closed to each other and having side ports, means forming a chamber enclosing said ports and having a vent, and a sleeve valve in said chamber axially slidably telescoping said first mentioned means and having, in position corresponding to the full suction condition of the device, a portion closing said outlet port, and a piston dividing said chamber into a chamber open to said vent and a suction chamber for said outlet port, means for biasing said valve away from said position, said valve cooperating with said first mentioned means to provide communication between said inlet port and said suction chamber.

WALTER D. TEAGUE, Jr.

REFERENCES CITED

The following references are of record in the file of this patent:

UNITED STATES PATENTS

| Number | Name | Date |
| --- | --- | --- |
| 383,314 | McLaughlin | May 22, 1888 |
| 970,225 | Holden | Sept. 13, 1910 |
| 1,343,375 | Peppercorn | June 15, 1920 |
| 1,900,514 | McLean | Mar. 7, 1933 |